Figures 1, 2:
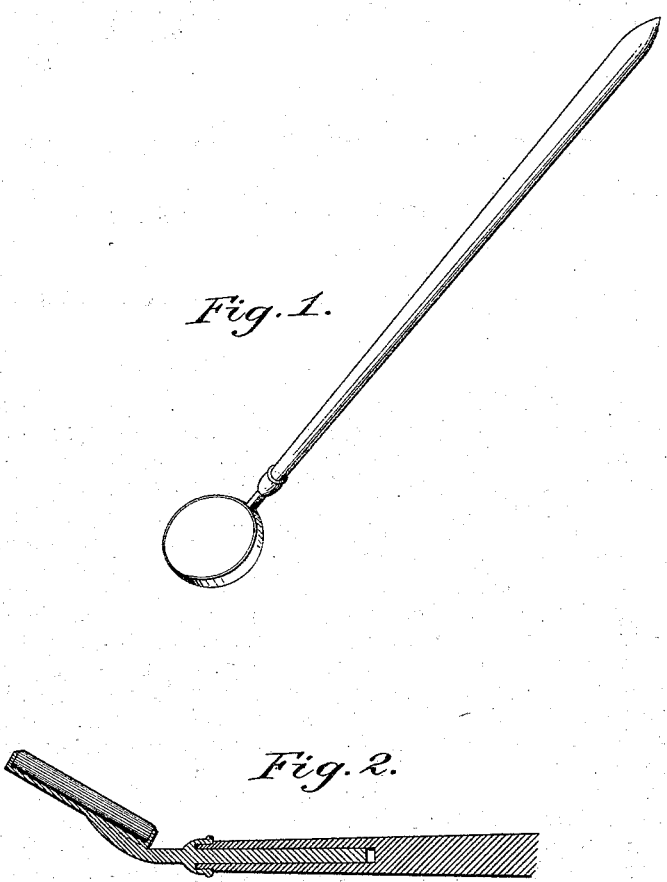

W. F. JOHNSTON.
Mirrors.

No. 153,899. Patented Aug. 11, 1874.

Witnesses.
A. K. Johnston
Theo. E. Green

Inventor.
Wilbur F. Johnston

UNITED STATES PATENT OFFICE.

WILLBUR F. JOHNSTON, OF BROOKLYN, NEW YORK.

IMPROVEMENT IN MIRRORS.

Specification forming part of Letters Patent No. 153,899, dated August 11, 1874; application filed June 8, 1874.

*To all whom it may concern:*

Be it known that I, WILLBUR F. JOHNSTON, of Brooklyn, Kings county, New York, have invented an Improvement in Mirrors, of which the following is a specification:

Heretofore mirrors used by dentists have been made by coating glass on one of its surfaces with quicksilver, or otherwise by placing just back of the glass some other metallic surface. These mirrors are used during the time operations are carried on in the mouth, as "excavating," filing, &c., either to reflect light upon that part of a tooth on which the operation is being performed, or by its reflection to better exhibit the cavity or the filling to the operator. Since the mouth is not a large workroom, it sometimes happens that the mirror is struck by the tools used by the dentist most frequently, perhaps, by his files, and the glass defaced, and finally ruined, by scratches made by the hard steel upon its surface. The glass is not sufficiently hard to withstand the rough usage almost necessarily given it in ordinary use.

To obviate this difficulty, and to make a more durable mouth-mirror, I have obtained plates and lenses of what is known as "pebble," or more properly "quartz," and substituted these for the plates and lenses of glass ordinarily used in making mirrors.

The reflecting surface may be prepared in any of the various ways now adopted in the manufacture of mirrors. I have found a mirror made of pebble, having one of its surfaces silvered, to be very greatly superior to the mirrors heretofore made. They are much more durable, being almost proof against files, and they present an unusually brilliant reflecting surface.

I claim—

As a new article of manufacture, a mirror constructed of pebble or quartz, substantially as and for the purpose specified.

WILLBUR F. JOHNSTON.

Witnesses:
A. K. JOHNSTON,
THEO. E. GREEN.